(12) United States Patent
Fishwick et al.

(10) Patent No.: US 8,929,451 B2
(45) Date of Patent: Jan. 6, 2015

(54) EXTERNAL VECTORS IN A MOTION ESTIMATION SYSTEM

(75) Inventors: Steven Fishwick, Kings Langley (GB); Stephen Morphet, St. Albans (GB)

(73) Assignee: Imagination Technologies, Limited, Kings Langley, Hertfordshire (GB)

(*) Notice: Subject to any disclaimer, the term of this patent is extended or adjusted under 35 U.S.C. 154(b) by 0 days.

(21) Appl. No.: 13/563,525

(22) Filed: Jul. 31, 2012

(65) Prior Publication Data

US 2013/0101041 A1    Apr. 25, 2013

(30) Foreign Application Priority Data

Aug. 4, 2011 (GB) .................................. 1113527.4

(51) Int. Cl.
*H04N 7/12* (2006.01)
*H04N 19/56* (2014.01)
*H04N 19/51* (2014.01)
*H04N 19/61* (2014.01)

(52) U.S. Cl.
CPC ..... *H04N 19/00684* (2013.01); *H04N 19/0066* (2013.01); *H04N 19/00781* (2013.01)
USPC .................................................. 375/240.16

(58) Field of Classification Search
CPC ........................................................ H04N 7/50
USPC ................................................... 375/240.16
See application file for complete search history.

(56) References Cited

U.S. PATENT DOCUMENTS

| | | | |
|---|---|---|---|
| 5,886,742 A | 3/1999 | Hibi et al. | |
| 6,137,837 A | 10/2000 | Nemiroff et al. | |
| 6,240,211 B1 | 5/2001 | Mancuso et al. | |
| 6,317,136 B1 | 11/2001 | Choi | |
| 6,385,245 B1* | 5/2002 | De Haan et al. | 375/240.16 |
| 6,724,823 B2* | 4/2004 | Rovati et al. | 375/240.17 |
| 7,720,150 B2 | 5/2010 | Lee et al. | |
| 8,130,837 B2 | 3/2012 | Heyward | |
| 8,670,483 B2 | 3/2014 | Morphet et al. | |
| 2001/0014124 A1 | 8/2001 | Nishikawa | |
| 2002/0181590 A1 | 12/2002 | Bellers | |
| 2005/0163221 A1* | 7/2005 | Oka et al. | 375/240.16 |
| 2005/0243927 A1 | 11/2005 | Hubrich et al. | |
| 2007/0002058 A1* | 1/2007 | Wittebrood | 345/475 |
| 2007/0092111 A1* | 4/2007 | Wittebrood et al. | 382/107 |
| 2007/0104275 A1 | 5/2007 | Heyward | |
| 2007/0183505 A1 | 8/2007 | Shimizu et al. | |
| 2010/0284627 A1* | 11/2010 | Lin et al. | 382/275 |
| 2013/0155228 A1* | 6/2013 | Farn et al. | 348/143 |

OTHER PUBLICATIONS

GB1113527.4 Search and Examination Report.

* cited by examiner

*Primary Examiner* — Sath V Perungavoor
*Assistant Examiner* — James Pontius (57) ABSTRACT

A method and apparatus for motion estimation in a sequence of video images is provided. Each field or frame in a sequence of video images is sub-divided into a plurality of blocks. Each block in each video field or frame has assigned to it a set of candidate motion vectors. The vector which produces a best match to a block in a previous field or frame, from the set of candidate motion vectors, is assigned to that block thus forming the motion vector field for the current video field or frame using the selected vector. The set of candidate motion vectors assigned to a block include one or more candidate vectors derived from an external source vector field and each such vector from an external source vector field is assigned a weighting that biases towards or away from the selection of that vector.

36 Claims, 8 Drawing Sheets

Conventional Art

FIG. 1

Conventional Art

Conventional Art

EXTERNAL VECTORS IN A MOTION ESTIMATION SYSTEM

CROSS REFERENCE TO RELATED APPLICATIONS

This application claims priority to GB App. Ser. No. 1113527.4, filed Aug. 4, 2011; this application is incorporated in its entirety herein for all purposes.

BACKGROUND

1. Field

The following relates to a method and apparatus for motion estimation for use in video sequences, and, in particular to methods associated with the introduction of candidate motion vectors taken from an external source.

2. Related Art

Motion estimation is used in various video techniques, and a wide range of methods for motion estimation are well known. One common method, known as block based motion estimation, will be used for illustration purposes in this document.

Block based motion estimation generally takes two or more consecutive frames from a video sequence and subdivides them into multiple regions known as blocks or macroblocks. In a motion search procedure, pixel data in each block in a frame is compared with pixel data from various candidate locations in a previous frame. The relative position of the candidate that gives the best match gives a vector that describes the motion in the scene at that block position. Collectively, the set of motion vectors at each block position in a frame is known as the motion vector field for that frame.

Video sequences typically comprise a series of non interlaced frames of video data, or a series of interlaced fields of video data. The interlaced sequences are produced by fields which carry data on alternate lines of a display, such that a first field will carry data for alternate lines, and a second field will carry data for the missing lines. The fields are thus spaced both temporally and spatially. Every alternate field in a sequence will carry data at the same spatial locations.

Figure 1:
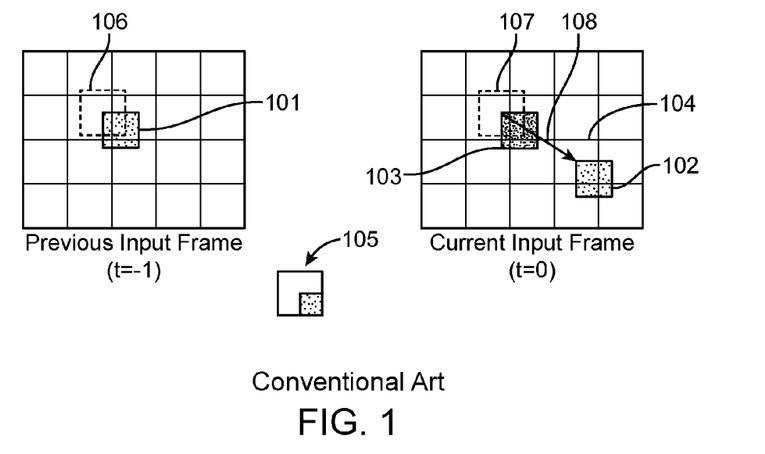
FIG. 1 illustrates a typical prior art block matching motion estimator.

FIG. 1 illustrates a typical example of a block matching motion estimator. In all the figures, including FIG. 1, motion vectors are shown with the head of the arrow at the centre of the block to which the vector corresponds. The frames are divided into blocks, and an object 101 in the previous frame has moved to position 102 in the current frame. The previous position of the object is shown superimposed on the current frame as 103. Motion estimation is performed for blocks rather than for objects, where a block of pixels in the current frame is matched with a block sized pixel area in the previous frame which is not necessarily block aligned. For example, block 104 is partially overlapped by the moving object 102, and has contents as illustrated at 105. Motion estimation for block 104, if it performs well, will find the pixel data area 106 in the previous frame, which can also be seen to contain the pixels illustrated in 105, i.e. a good match has been found. Superimposed back onto the current frame, the matching pixel data area is at 107. The motion vector associated with block 104 is therefore as illustrated by arrow 108.

Figure 2:
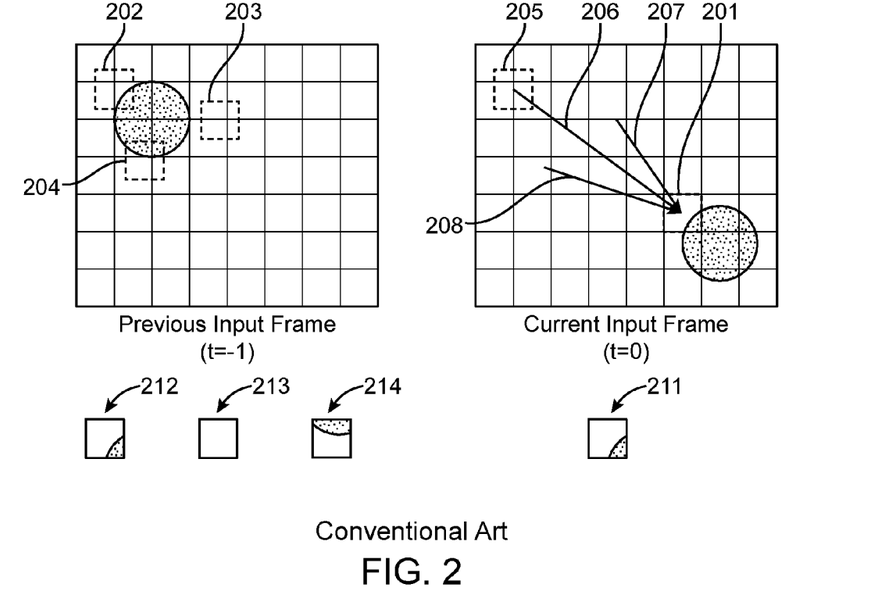
FIG. 2 illustrates how a block matching motion estimator selects a best motion vector from a set of candidate motion vectors by comparison of the corresponding pixel blocks.

Many block based motion estimators select their output motion vector by testing a set of motion vector candidates for a block using a method such as a sum of absolute differences (SAD) or mean of squared differences (MSD), to identify motion vectors which give the lowest error block matches. FIG. 2 illustrates the candidate evaluation process for the block 201 in the current frame which has pixel contents shown in 211. In this simple example system, three motion vector candidates 206, 207 and 208 are considered which correspond to candidate pixel data areas at locations 202, 203 and 204 in the previous frame. The pixel contents of these pixel data areas can be seen in 212, 213 and 214 respectively. It is apparent that the pixel data at location 202 provides the best match for block 201 and should therefore be selected as the best match/lowest difference candidate. Superimposed back onto the current frame, the matching pixel data area is at 205 and the associated motion vector is 206.

Different systems have different requirements of motion estimation. In a video encoder application, for example, the requirement is to form the most compact representation of a frame, by using motion vectors to reference pixel data from a previous frame from the sequence. These motion vectors generally focus on providing the "closest match" to a block of pixel data (or the lowest residual error), and while the resulting motion vectors are usually representative of the actual motion of objects in the scene, there is no requirement that this is always the case. In other applications, such as de-interlacing or frame rate conversion, where objects in the frame must be interpolated at intermediate positions between their locations in the source frames, it is more important that the motion vectors represent the "true motion" of objects in the scene, even if other distortions in the video mean that those vectors do not always give the closest match (or lowest residual error) between blocks of pixel data. By applying appropriate constraints to the candidate motion vectors during motion search, the results can be guided towards "closest match" or "true motion" as necessary.

Motion estimation and the vector fields produced can be generated using vastly different levels of computational resources. Encoders used by broadcasters, or for movie distribution, for example, may dedicate significant computational resources or extended offline processing time to producing vector fields of the highest quality. Conversely, many consumer level video pipelines, particularly those in handheld devices, must operate in real time and with significant limitations on the amount of computation resource (i.e. bandwidth, power and time) allocated to motion estimation. Consequently, in these systems it is impractical to apply exhaustive search and intensive optimization processes, and this typically results in sub-optimal motion vector fields being produced.

One common approach to achieving the highest quality motion vector field within a computational resource limited environment is to identify and test a small set of motion vector candidates for each block. The challenge is in identifying the smallest possible set of vector candidates while still retaining a high probability of including in the set, one or more vector candidates that provide either a close pixel match or true motion match as required. Improving the set of candidate motion vectors allows either fewer motion vectors to be tested (improving efficiency) or increases the likelihood of a close pixel match or a true motion match being found (improving quality).

Motion vectors are known to be highly correlated both spatially and temporally with vectors in adjacent blocks, so these neighbouring vectors are often used as the basis of a motion estimator's set of vector candidates. A pseudo-random element may also be incorporated into the candidates to allow the system to improve its matches, or to adapt as the motion in the video changes. Where a block has motion that is not simply predicted by its neighbours, the pseudo-random perturbation of vector candidates can often predict the changes in motion. This method works well for slowly changing vector fields, but tends not to allow the motion estimator to detect or converge quickly upon new motions that are significantly different to the motion vector candidates stored in neighbouring blocks. A system relying on pseudo-randomness may wander towards the new motion over time, but is prone to becoming stuck in local minima, or converging so slowly that the motion has changed again by the time it gets there.

Figure 3:
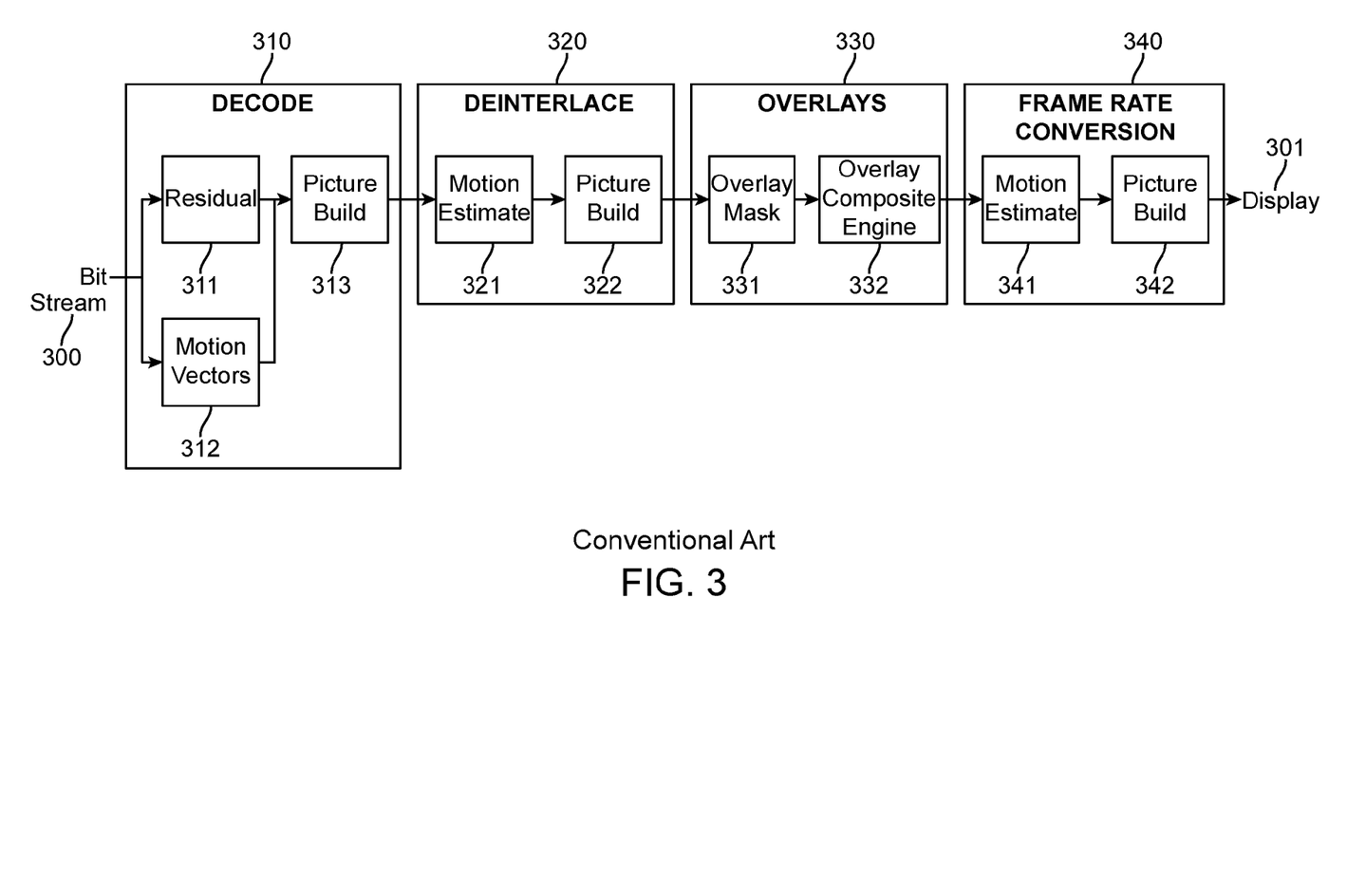
FIG. 3 shows a simplified example of a prior art conventional video pipeline architecture.

FIG. 3 shows a simplified example of a conventional video pipeline architecture. In this simplified architecture the decode block 310 decodes a compressed input bit stream 300 into a set of motion vectors 312 and a residual 311. When combined in the picture builder 313 a sequence of output images are produced. This sequence of output images may consist of either progressive frames or interlaced fields depending upon the nature of the source. Interlaced fields are converted into progressive frames by a deinterlacer 320. High quality deinterlacing typically performs motion estimation 321 followed by a picture build 322 process in a manner which will be well known to those skilled in the art. Optionally, overlays 330 such as subtitles and/or user interface may be added to the video sequence by first identifying the location of the overlay pixels to produce an overlay mask 331 and then, in the region defined by the overlay mask, compositing the overlay's pixel data and the original video pixel data in an overlay compositing engine 332. Finally frame rate conversion 340 is performed to convert the input frame rate of the video sequence to the output frame rate required by the display 301. Frame rate conversion 340 typically requires motion estimate 341 and picture build 342 processes in a manner which will be well known to those skilled in the art.

It is apparent from the simple example system shown in FIG. 3 that multiple motion estimation processes and other vector sources that are not motion estimators may exist in a typical video pipeline. The decode block's motion vector field 312 will find closest match/lowest error vectors that have typically been determined using significant computational resources external to the video pipeline. Motion estimation 321 in the deinterlace block 320 must determine true motion vectors using field data and the motion estimation in the frame rate conversion block 341 must determine true motion vectors using frame data. It is also possible for the overlay mask 331 to define regions of the frame with known motion vectors (e.g. either a static or animated overlay). Performing motion estimation at each of these locations seems inherently wasteful and it is proposed that a motion estimator later in the pipeline could be improved by using the motion vectors generated earlier in the pipeline.

Conventional video pipeline systems tend not to reuse motion vectors partly because the individual blocks (such as decode, deinterlace, overlays and frame rate conversion) tend to be designed independently, often coming from different vendors. In these distinct blocks each block has little to no visibility of the internal workings of the other blocks in the video pipeline. More crucially, video pipeline systems tend not to reuse motion vectors from elsewhere in the pipeline because of the different requirements of the motion estimators available. For example, the motion vector field available at 312 containing vectors produced to identify the closest matching pixels (or lowest residual) will have no requirement that the motion vectors represent the true motion of objects in the scene and therefore is a potentially poor source of vector candidates for both the deinterlace motion estimator 321 and the frame rate conversion motion estimator 341. While the deinterlace motion estimator 321 and the frame rate conversion motion estimator 341 both produce motion vector fields looking for the true motion of objects in the scene, one is working on field data and one is working on frame data giving rise to different, albeit related, motion vector fields.

Figure 4:
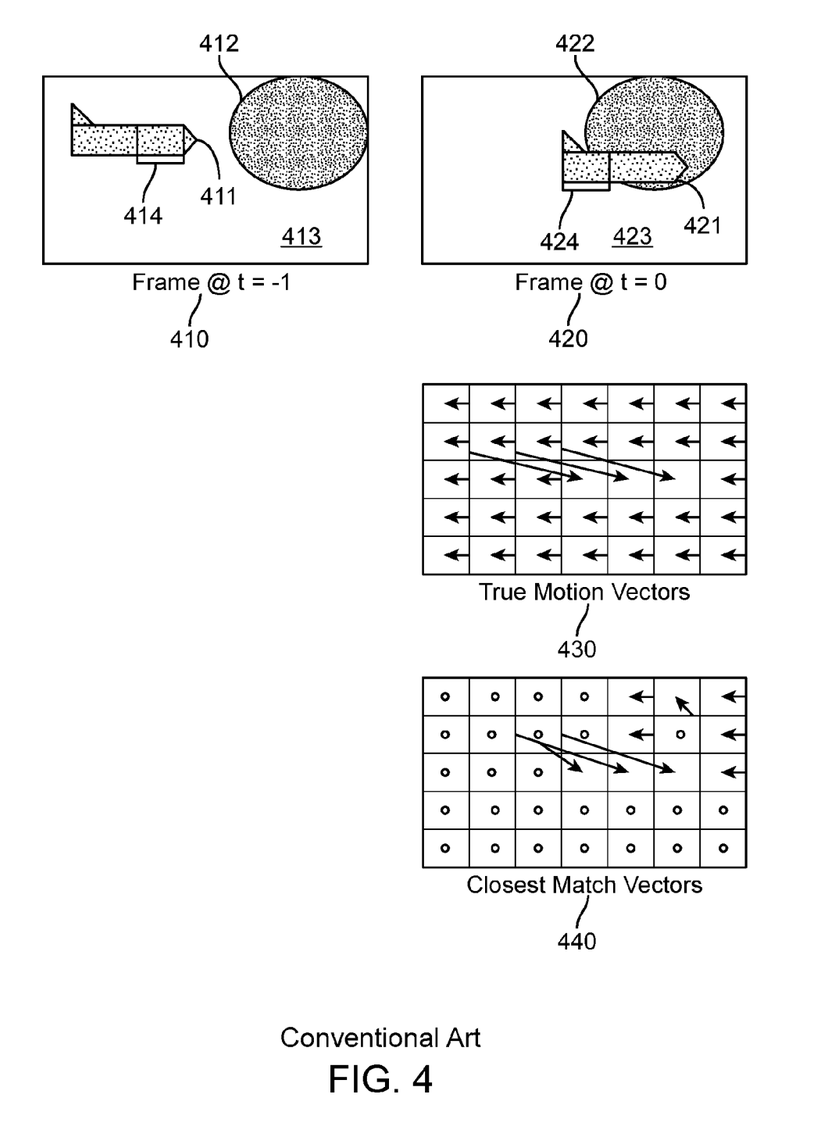
FIG. 4 illustrates the motion vector fields produced by a motion estimator seeking the true motion of objects in a scene (430), and the closest matching blocks (440), given the same input frames.

FIG. 4 illustrates the issues that would be faced by a conventional video pipeline if it were to try and reuse motion vectors from another motion estimator in the pipeline or from an external source. Two consecutive frames 410 and 420 from a video sequence are shown from time instances t=−1 and t=0 respectively. In these frames an aeroplane located at 411 is flying diagonally down and right across the scene to location 421. Simultaneously the entire background (sun 412 and sky 413) are panning left behind the aeroplane (with sun moving to location 422 and sky moving to location 423). A true motion vector field for these frames is shown as 430, where the true motion of the aeroplane 411 is shown by the closed head arrow motion vectors, and the true motion of the background sun 412 and sky 413 are shown by the open head arrow motion vectors. Contrast these true motion vectors with a representative motion vector field produced by a motion estimator requiring the closest matching pixels 440 (with zero motion vectors shown as black dots). While some motion vectors happen to be the same or similar to the true motion of the objects in the frame, there are clearly significant differences in the produced motion vector fields. Specifically, the lack of detail in the sky regions 413 and 423 and the lack of detail in the centre of the sun object 412 and 422 have led to the selection of motion vectors that provide very good pixel matches between the two frames but which are not representative of the true motion of the objects. Also note that a typical encoder considers some vectors as being "easier" or "cheaper" to encode than others. This may lead to the selection of a motion vector that is not necessarily the best pixel match but can be represented in a more compact form. For example, the block 424 containing the back of the plane 421 in frame 420 is matched sufficiently well by an area of pixels 414 containing the front of the plane 411 in frame 410, that the shorter vector is selected, even though the vector found is not representative of the true motion of the plane.

The differences in the requirements of the various motion vector fields present significant risks to their re-use in the later stages of a conventional video pipeline. Motion estimators looking for the true motion of objects typically include the quality of the pixel match as part of their vector candidate evaluation process. It is therefore inherently risky to include motion vectors that have very good pixel matches but do not represent true motion as they can confuse the vector selection process. Similarly, it may be wasteful to include motion vector candidates that identify the true motion of objects in a motion estimator trying to find the closest match (or lowest residual) because that motion vector candidate may have been better used in finding a local minimum or testing a vector candidate that could be represented in a more compact form.

The risks and inefficiencies of including motion vector candidates from an external source vector field are typically so high in a conventional video pipeline that they are not used. One common exception is a transcoder which will be well known to those skilled in the art. In a transcoder it is often known that the motion vector field present in the decode block will be suitable for use in a subsequent encode block. As the motion vectors provided by the decode process and the motion vectors required by the encode process have the same requirements it is common for the decoder's motion vectors to be used directly by the encoder without requiring further motion estimation. The transcoder is a special case where an entire motion estimation process can be saved by integration of blocks in the video pipeline. When the decoder motion vectors are suitable for use in the encoder, there is no risk in using them directly, without further motion estimation. The absence of a second motion estimator in the system means that transcoder applications are outside the scope of this invention.

SUMMARY

While the differing requirements of motion estimators, and the risks of including vectors from arbitrary motion vector fields as vector candidates during motion estimation, preclude their use in a conventional video pipeline it can be seen that in many cases the closest match (or lowest residual) vector will be very similar to the true motion of the object in the scene and vice versa. It is logical that a vector accurately identifying the motion of an object will often also result in a very close pixel match—assuming the object isn't significantly distorted or occluded between frames. The inverse of this assertion may also be true, as a close pixel match will often have arisen because the selected vector is close to the true motion of an object in the scene. If vector fields could be reused without the associated risks and inefficiencies of introducing bad motion vector candidates to the current motion estimator then the efficiency and quality of all of the motion estimation processes could be improved. Furthermore, high quality motion vector fields produced using significant computational resources and offline processing could significantly increase the quality of motion estimation in the computational resource limited motion estimation processes.

Embodiments provide an efficient method of introducing candidate motion vectors into a motion estimator from other vector field sources in the video pipeline. Accordingly, good candidates that may be unavailable through conventional candidate motion vector generation techniques can be introduced, allowing fewer motion vector candidates to be tested (improving efficiency), better motion vectors to be selected (improving quality), or both.

In accordance with one aspect, there is provided a method for motion estimation in a sequence of video images. The method comprises subdividing each field or frame of a sequence of video images into a plurality of blocks and assigning to each block in each video field or frame a set of candidate motion vectors. For each block in a current video field or frame, the vector that produces a best match to a block in a previous video field or frame, from the set of candidate motion vectors assigned to that block is selected. A motion vector field for the current video field or frame using the selected vector for each block is formed. The set of candidate motion vectors assigned to a block include one or more candidate vectors derived from an external source vector field. Each candidate motion vector from an external source is assigned a weighting value that biases towards or away from the selection of that candidate motion vector.

There is further provided an apparatus for motion estimation in a sequence or video images comprising: means for subdividing each field of frame of a sequence of video images into a plurality of blocks; means for assigning to each block in each video field or frame a set of candidate motion vectors; means for selecting, for each block in a current video field or frame, the vector that produces a best match to a block in a previous video field or frame, from the set of candidate motion vectors assigned to that block; means for forming a motion vector field for the current video field or frame using the selected vector for each block; wherein the set of candidate motion vectors assigned to a block include one or more candidate vectors derived from an external source vector field, and wherein each candidate motion vector from the external source is assigned a weighting value that biases towards or away from the selection of that candidate motion vector.

Aspects available to be claimed include a method for motion estimation in a sequence of video images substantially as herein described. Further aspects available to be claimed included an apparatus for motion estimation in a sequence of video images substantially as herein described with reference to the accompanying drawings.

BRIEF DESCRIPTION OF THE DRAWINGS

Embodiments and aspects will now be described in detail by way of example, with reference to the accompanying drawings in which.

DETAILED DESCRIPTION

The disclosed examples are in the context of a motion estimation system operating on a non-interlaced, or progressive, video signal, in which the video comprises a series of full frames of data. Motion estimation is also commonly performed on interlaced video where the video comprises a series of fields. The disclosed aspects, examples, and principles are equally applicable to motion estimators operating on both non-interlaced and interlaced video. Accordingly, the term "field or frame" or "video field or frame" covers motion estimation on both an interlaced and a non-interlaced video signal. If the term "frame" is used, it should be interpreted as "field or frame", that is to say, to cover both motion estimation performed on a non-interlaced video signal and an interlaced video signal.

The terms "current", "previous" and "following" are relative terms used simply to indicate the sequential order of frames or fields in the video signal. A "previous" field or frame can be any number of frames earlier than a "current" field or frame; it does not necessarily need to be immediately before the "current" field or frame, although in practice it often will be. A "following" field or frame can be any number of frames later than a "current" field or frame; it does not necessarily need to be immediately after the "current" field or frame, although in practice it often will be. Features described in relation to one example or aspect may also be applicable to other aspects of the invention.

For each block in a video field or frame, a block processing unit of a block based motion estimator receives a set of candidate motion vectors from which one representative motion vector for the block must be selected. The motion estimator compares the pixels of each block in a current frame with pixel data areas in a previous frame, the positions of which are defined by a spatial offset equal to each candidate motion vector. These pixel data areas are not constrained to being block aligned. The vector selection process is illustrated in FIG. 2 where the block areas corresponding to each motion vector candidate are compared using a metric such as one based on a sum of absolute differences (SAD) or mean squared difference (MSD), and typically incorporating other weighting terms. The vector chosen to represent the motion at a block is the candidate motion vector that gives the best score using the chosen metric. Finding good matches relies on the set of candidate vectors including either the true motion vector of an object present in the block or a candidate that results in a good block match (depending on the application requirements).

The production and re-use of existing motion vector fields from a source external to the current motion estimator is proposed as a novel route to improving the quality of motion estimation in areas of rapid or changing motion and potentially allowing fewer motion vector candidates to be used.

Figure 5:
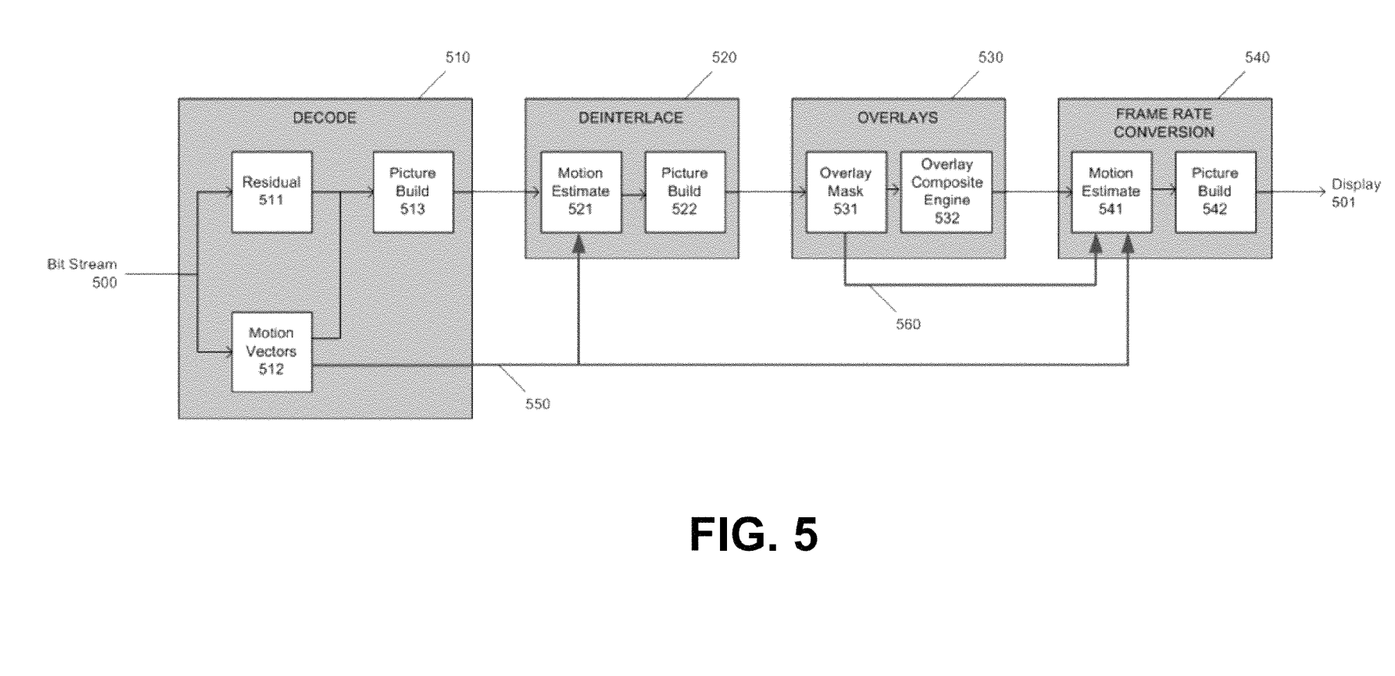
FIG. 5 shows the conventional video pipeline example architecture modified to include vector candidates from external sources.

FIG. 5 shows a modified version of the example video pipeline previously shown in FIG. 3 with the addition of data paths that allow external motion vector fields produced earlier in the video pipeline to be used as motion vector candidates by motion estimation processes later in the video pipeline. In this modified video pipeline, the motion vectors 512 from the decode block 510 are made available outside of the decode block by a new data path 550 for re-use as motion vector candidates in the deinterlacer 520 motion estimator 521, followed by picture build 522 process, and the frame rate conversion 540 motion estimator 541, followed by picture build process 542.

Additionally, FIG. 5 shows the introduction of a new data path 560 between the overlay block mask 531 and the motion estimation block 541 in the frame rate conversion 540. Overlays 330, such as subtitles and/or user interface, may be added to the video sequence by first identifying the location of the overlay pixels to produce the overlay mask 531 and then, in the region defined by the overlay mask 531, compositing the overlay's pixel data and the original video pixel data in an overlay compositing engine 532. This data path illustrates that the system is able to utilize motion vector candidates from a source of image data for which some or all of the motion vectors are known but which have not been produced by a motion estimator. Consider the simple case of a static, opaque overlay (e.g. subtitle text on a movie, or a user interface window added by a TV set). In these cases a clearly defined region of the screen can be identified as being static. This could be represented by storing a zero motion vector in a vector field at all locations covered by the static overlay. In more complex examples the overlay may be moving within the screen and a motion vector equal to the motion of the overlay would be stored instead of the zero motion vector. It is apparent that these motion vectors represent good motion vector candidates for use in a motion estimator. The risk and benefits afforded by using these motion vector candidates in a motion estimator become less clear in real world situations. If the resolution of the vector field generated from the overlay mask is different from the resolution of the motion estimator, the motion vector of the overlay may not provide either the true motion or the closest (or lowest residual) match for the majority of pixels in the block. Similarly, in the common case where the overlays produced are not completely opaque the usefulness of the overlay mask generated vector field may depend upon the level of transparency or upon the content of the overlay. A near transparent overlay, for example, is unlikely to be the dominant visible feature of a block and therefore the motion vector of the overlay will not adequately describe the dominant motion of the pixels in the block. In contrast, for an opaque overlay covering the block it is guaranteed that the motion vector of the overlay describes the motion vector of the dominant feature present in the block.

A variety of further external motion vector field sources could be used by this invention. Examples will be known to those skilled in the art and include motion vector sources such as vectors derived from computer graphics engines as described in British patent application no. GB2480422 and from movement sensors such as gyroscopes and accelerometers fitted to video recording devices.

The inclusion of motion vector candidates from an external vector source can be a worthwhile addition to the set of motion vector candidates used in a current motion estimator. In many cases these motion vectors may have been generated using significant computational power and/or information that is unavailable in the current motion estimator and as such can introduce useful motion vector candidates that would be otherwise be unavailable The risks involved in using motion vectors from external sources have already been discussed, and have previously meant that it has not been safe to consider these vectors as candidates in a motion estimator. Therefore a method of assigning a weighting value to each motion vector candidate from an external source is used. The weighting value for each motion vector candidate may be incorporated into the metric used by the vector selection process in such a way as to bias towards or away from the selection of that candidate by the current motion estimator. In this way, the current motion estimator is able to vary the way in which it uses motion vectors from an external source according to the degree to which that source can be determined to be trustworthy. In some cases it may be possible for the apparatus generating the external source motion vector field to provide the weighting values directly. Alternatively, the weighting values can be determined from the external source by the current motion estimator.

Figure 6:
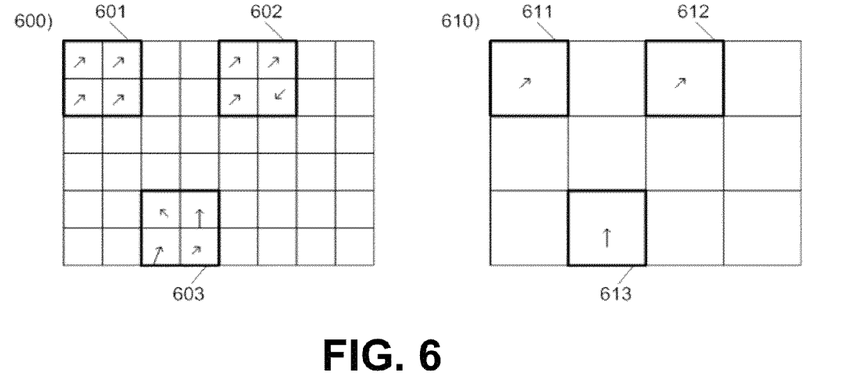
FIG. 6 illustrates changing the resolution of a motion vector field including the generation of weighting values that bias towards or away from the selection of motion vectors in that field for use by a later motion estimator.

FIG. 6 illustrates an example where the weighting value that biases towards or away from the selection of a candidate motion vector from the external source is determined from the external source. In this example, a high resolution motion vector field 600 from an external source is used to introduce motion vector candidates to a motion estimator working at a lower block resolution, 610. The motion estimator's resolution is half that of the external source vector field as illustrated by the difference in block areas. For each block in the motion estimator 610, a vector may be derived from the external vector field for use as a candidate motion vector in the motion estimation of that block. The block of pixels 611 in the motion estimator can be seen to correspond to the region 601 in the high resolution external motion vector field. Region 601 contains four identical motion vectors, which implies that that motion vector is a good motion vector candidate for the current block 611. As all of the motion vectors in 601 have the same direction and magnitude, the motion vector candidate in 611 may be assigned a strong weighting value that biases towards the selection of this motion vector candidate. Similarly, block 612 in the motion estimator can be seen to correspond to the region 602 in the high resolution external motion vector field. Three of the available motion vectors have the same size and magnitude, so it is likely that this dominant vector will be used as a motion vector candidate in block 612. This motion vector candidate should be assigned a weighting value that biases towards its selection. In this case the weighting value should not be as strong as was previously assigned to the motion vector candidate in block 611, due to the presence of a motion vector in region 602 of the external vector field that disagrees with the dominant motion of the region.

An alternative scheme is shown for the block sized area of pixels 613 which corresponds to the region 603 in the high resolution external motion vector field. In this case, the four motion vectors in this region of the external motion vector field are all different so no clear dominant motion vector candidate can be seen for use as a motion vector candidate in block 613. In this case a weighting value should be chosen that biases away from the selection of any motion vector candidate that can be derived from region 603.

The methods used to derive a motion vector candidate from an external vector field, and for the assignment of a weighting value to that candidate are application specific. In one embodiment, where a motion vector candidate must be derived from an higher resolution external vector field, the candidate is derived by selecting the motion vector closest to the mean vector in the region corresponding to the block in which the candidate will be used. The mean motion vector's x component is determined by adding the x components of each of the vectors in the region and dividing by the number of vectors. The mean motion vector's y component is determined by adding the y components of each of the vectors in the region and dividing by the number of vectors. In an alternative embodiment, the mean motion vector is used directly as the motion vector candidate for the block.

The method used to determine a weighting value for each motion vector candidate is application specific. In one embodiment, weighting values that bias towards the selection of a candidate from a higher resolution external motion vector field are derived from the difference between the selected candidate and the mean motion vector in the region of the vector field from which the candidate was selected, while a weighting value that biases away from the selection of a candidate is chosen when there is no one vector that can be said to be dominant in the region.

While our examples use a mean vector, a person skilled in the art will appreciate that similar results might be obtained using methods based on a modal vector, or a variety of other, similar, techniques.

Figure 7:
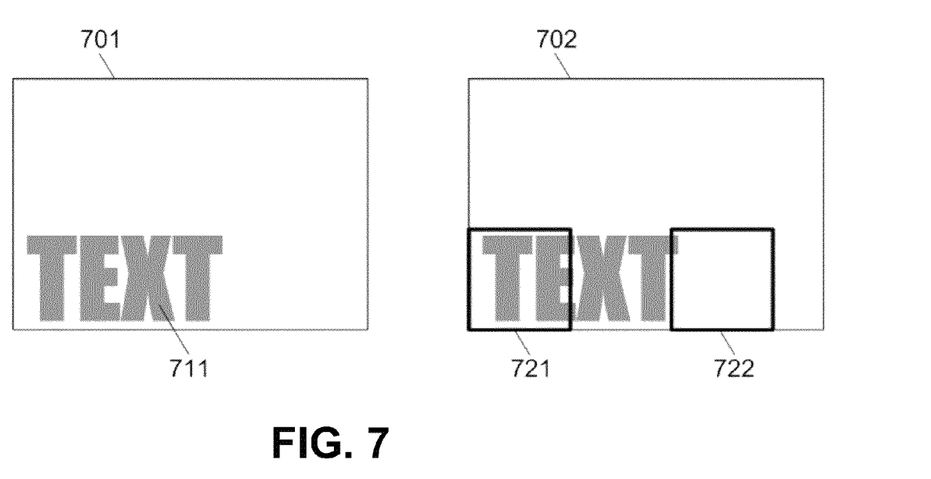
FIG. 7 illustrates the generation of a motion vector field from a pixel mask including the generation of weighting values that bias towards of away from the selection of motion vectors in that field for use by a later motion estimator.

FIG. 7 illustrates another example where the weighting value that biases towards or away from the selection of a candidate motion vector from the external source is determined from the external source. In this example, a frame 701 includes a static subtitle text overlay and associated pixel resolution overlay mask 711 that indicates the extents of the overlay. The motion vector is known to be zero at all locations within the mask, because the subtitle text is known not to be moving. In this case the external source does not indicate any motion vector for areas outside the mask. During motion estimation of the same frame 702 at a later stage in the video processing pipeline, it can be expected that the motion vector of the overlay will be useful as a motion vector candidate for any blocks that include pixels from the overlay. Two illustrative blocks are shown. Block 721 can be seen to include a large number of pixels from the overlay and therefore the associated zero vector in the high resolution vector field provides a good motion vector candidate for the block. The zero vector can therefore be used with a high degree of confidence. The method used in the assignment of a weighting value that biases towards or away from the selection of the overlay vector is again application specific, however for this worked example a method is disclosed where the weighting is dependent upon the proportion of the pixels in the block which are covered by the overlay mask. Accordingly, block 721 which contains a high number of overlay pixels would include the overlay motion vector candidate with a weighting that strongly biases towards the selection of the overlay vector, whereas block 722 which contains a small number of overlay pixels would include the overlay's motion vector candidate with a weighting that biases against the selection of the motion vector candidate. The weightings allocated may be further modified by the opacity of the overlay, where an increasing degree of transparency decreases the weighting value used to bias towards the selection of the overlay vector.

In a further embodiment, a weighting value is assigned to an external source of motion vectors such that the motion estimator is biased towards or away from the selection of any motion vector candidates coming from that source. A weighting value assigned to an entire external vector source may be used instead of, or in addition to, the weighting values described previously which are derived individually for each motion vector candidate derived from the external source. A weighting value assigned to an entire external vector source may be considered to represent the degree to which that source is trusted to provide suitable candidates to the current motion estimator. For example, a motion estimator attempting to determine true motion would not consider candidate vectors from a closest match motion estimator entirely trustworthy and would bias against their selection to some extent. On the other hand, the same true motion estimator might consider candidate vectors from a broadcast quality true motion estimator to be particularly trustworthy, and would bias towards their selection. Furthermore, the weighting value assigned to an external source may vary over time, determined, for example, by the degree to which vectors from that external source prove useful as candidates in the motion estimator.

Figure 8:
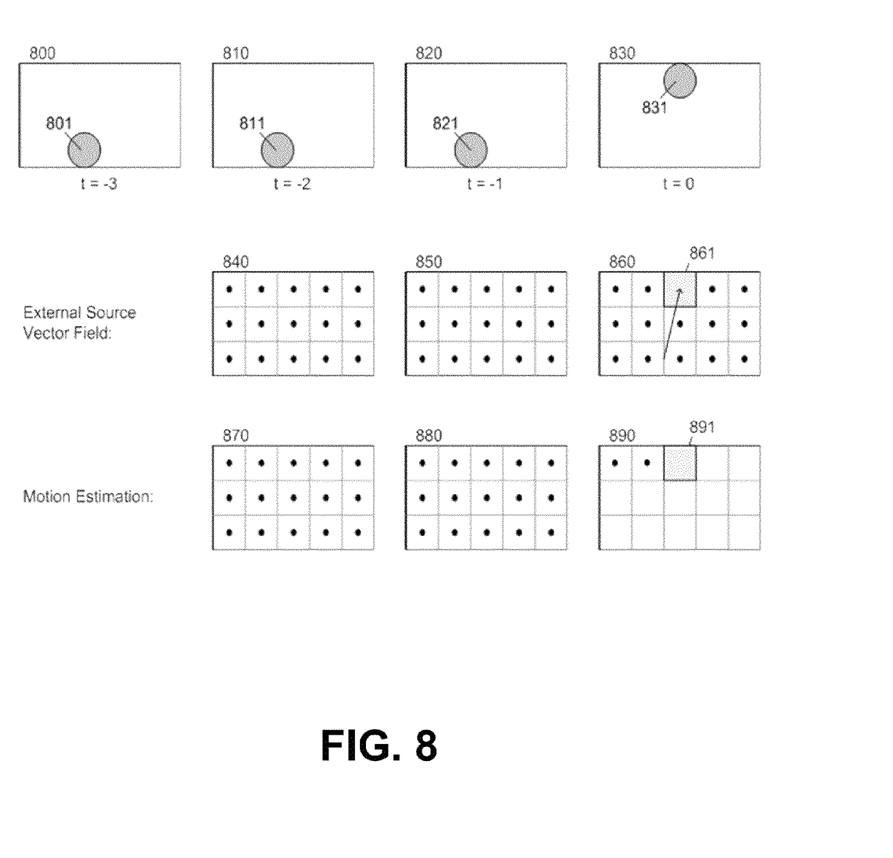
FIG. 8 illustrates the introduction of an unlikely motion vector from an external source.

FIG. 8 illustrates an example where the weighting value of the external source motion vectors is used to allow the selection of a motion vector candidate that may otherwise have been discarded by the motion estimator. Input frames 800 and 810 at time instances t=−3 and t=−2 respectively have associated with them the external source vector field shown at 840. The motion vector field produced by the current motion estimator is shown at 870. Between these two source frames nothing has moved. The external source vector field contains zero vectors (represented by a black dot) at every location, and is in agreement with the motion vector field produced by the current motion estimator. This result indicates that the external source vector field is providing good motion vector candidates for use by the current motion vector field and is therefore assigned an increased weighting that will bias towards the selection of motion vector candidates from that external source in the future. When the next frame 820 arrives at time instance t=−1, the motion vectors provided by the external source again prove a good match for the as selected best motion vectors by the current motion estimator. This further increases the weighting that biases towards the selection of motion vector candidates from that external source. When the next frame 830 arrives at time instance t=0, the shaded circle that had remained static at locations 801, 811 and 821 in previous frames suddenly moves upwards to location 831 in the current frame. Many block based motion estimators would fail to identify this motion immediately. The motion to location 831 in the current frame (corresponding to block 891 in the current motion estimator) is not anticipated by motion vectors in adjacent blocks or previous frames and the magnitude of the motion is too large to be found by simple pseudo-random perturbations of neighbouring block vectors. It is therefore unlikely that the correct vector would be available as a candidate in a prior art motion estimator.

In this example, the external source vector fields 840 850 860 contain the correct motion vector in block 861, perhaps through additional information available during the creation of its vector field or through a more computationally expensive search process. Typically, when a motion vector candidate from an external source is significantly different from surrounding vectors in both the external source vector field 860, and in the motion vector fields 870, 880, and 890 produced by the current motion estimator, that candidate might be penalized heavily as being too risky or too inefficient to select. However, in this case, according to the example method disclosed, a strong bias towards selection of motion vector candidates derived from the external source vector field has been developed over a number of previous frames. If this bias is sufficient to overcome other biases against selection of the candidate then the vector will be stored at block 891 in the output vector field of the current motion estimator. If the external source vector accurately predicted the new motion of the shaded circle between frames 820 and 830 it allows the selection of a good motion vector result that would otherwise have been unavailable.

In some cases it may be possible for the apparatus generating the external source motion vector field to provide a weighting value for its own vector field to indicate the suitability of the motion vectors therein for use as motion vector candidates by the current motion estimator. Alternatively, the weighting value for the external source of motion vectors can be determined from the external source by the current motion estimator.

A weighting value for the external source of motion vectors can be determined for the external source by the current motion estimator in one of several ways. Some of these methods produce a weighting value for the external source of motion vectors based on the degree of similarity between the motion vectors provided by the external source and the motion vectors produced by the current motion estimator. Similarity between vectors may be measured by determining whether the vectors have the same magnitude and direction, (often with a small amount of allowable variation, determined according to the application), by entropic measures, or by other methods well known to those skilled in the art. Vector field similarity can be defined in terms of vector similarity in the locality of the current block, globally across the frame, or can be based on historical similarity, either across previous vector fields or a recent history of processed vectors in the current frame.

In general, if the motion vectors from the external source generally agree with the motion vectors selected by the current motion estimator then the external source is a good source of motion vector candidates for the current motion estimator. It may therefore be considered that the external source vectors are to be trusted and should be evaluated even when they appear to introduce motion vector candidates that would normally be excluded for violating spatial and temporal consistency checks. These unexpected motion vector candidates may be due to new motions in the scene that are known about or have been detected by the external source. Unexpected motion vectors introduced by the external vector source that are determined to have been poor candidates for the current motion estimator may be used to modify the weighting associated with the external source and reduce the likelihood of them being used in future. Unexpected motion vectors introduced by the external vector source that are determined to have been a good candidate for the current motion estimator and would otherwise have been missed may be used to modify the weighting associated with the external source to increase the likelihood of unexpected motion vector candidates being considered in the future.

Figure 9:
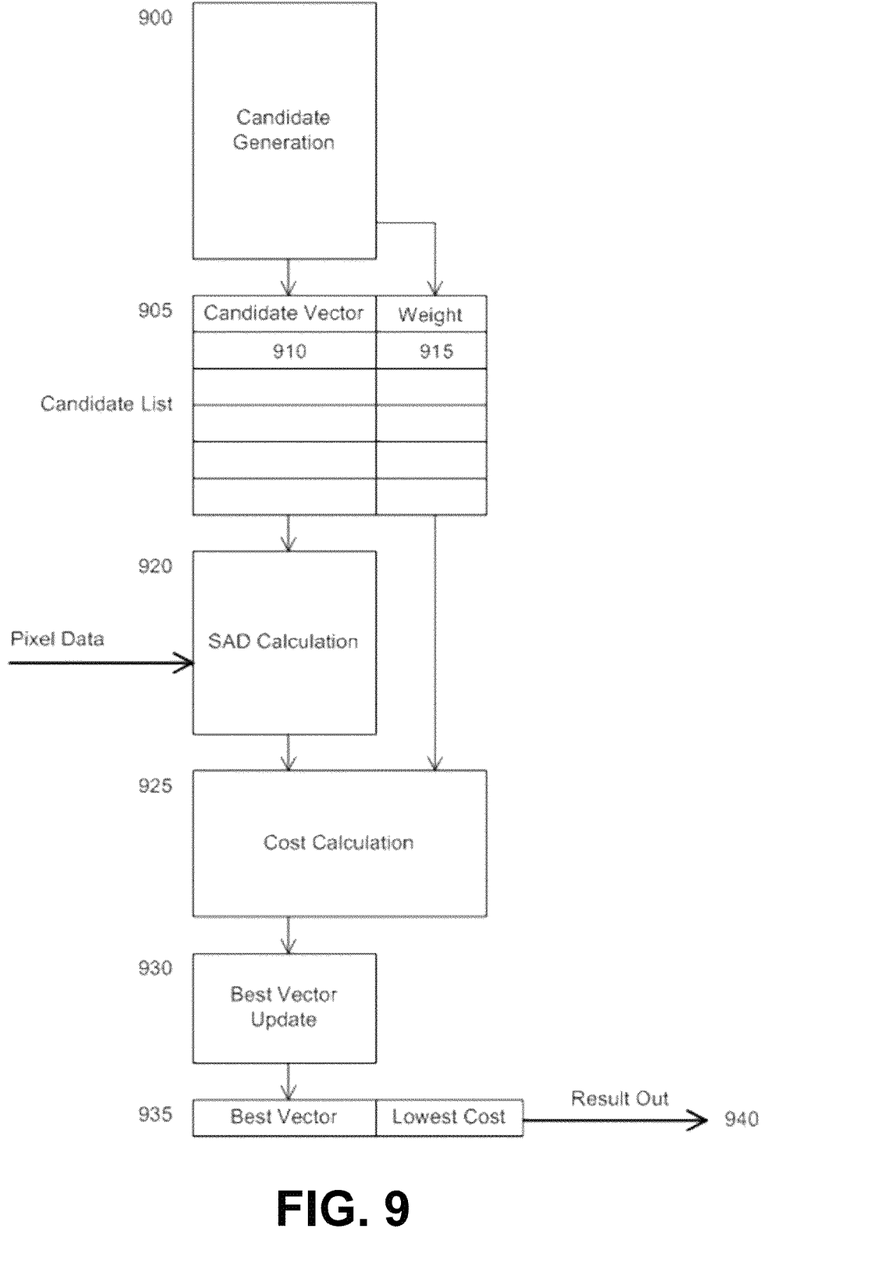
FIG. 9 is a block diagram showing motion vector candidate evaluation with weighting terms.

FIG. 9 is a block diagram showing an example of a conventional system for motion vector candidate evaluation. A candidate generation unit 900 generates a number of motion vector candidates using methods known in the art, such as the use of vectors from spatially and temporally adjacent blocks, and the use of pseudo-random variation. Candidate generation results in a candidate list 905, which may include both the list of candidate vectors, 910, and a set of weighting values, 915.

Candidate vectors from the list are evaluated to determine the quality of the block match, for example using an SAD calculation 920. The cost calculation block 925 combines the SAD value with terms derived from the weighting values 915 corresponding to the candidate vector to produce the metric by which vector selection will be determined. The system is able to guide the motion estimation process, for example towards "closest match" or towards "true motion" by appropriate control over the contents of candidate vector list 910, and the assignment of appropriate weights 915 to each candidate vector.

As motion vector candidates are evaluated, the best vector update block 930 compares the cost metric with that of previous candidates, and updates the best vector storage 935. After each vector in the candidate list 905 has been evaluated, the best vector, and its associated cost, is available at output 940.

Figure 10:
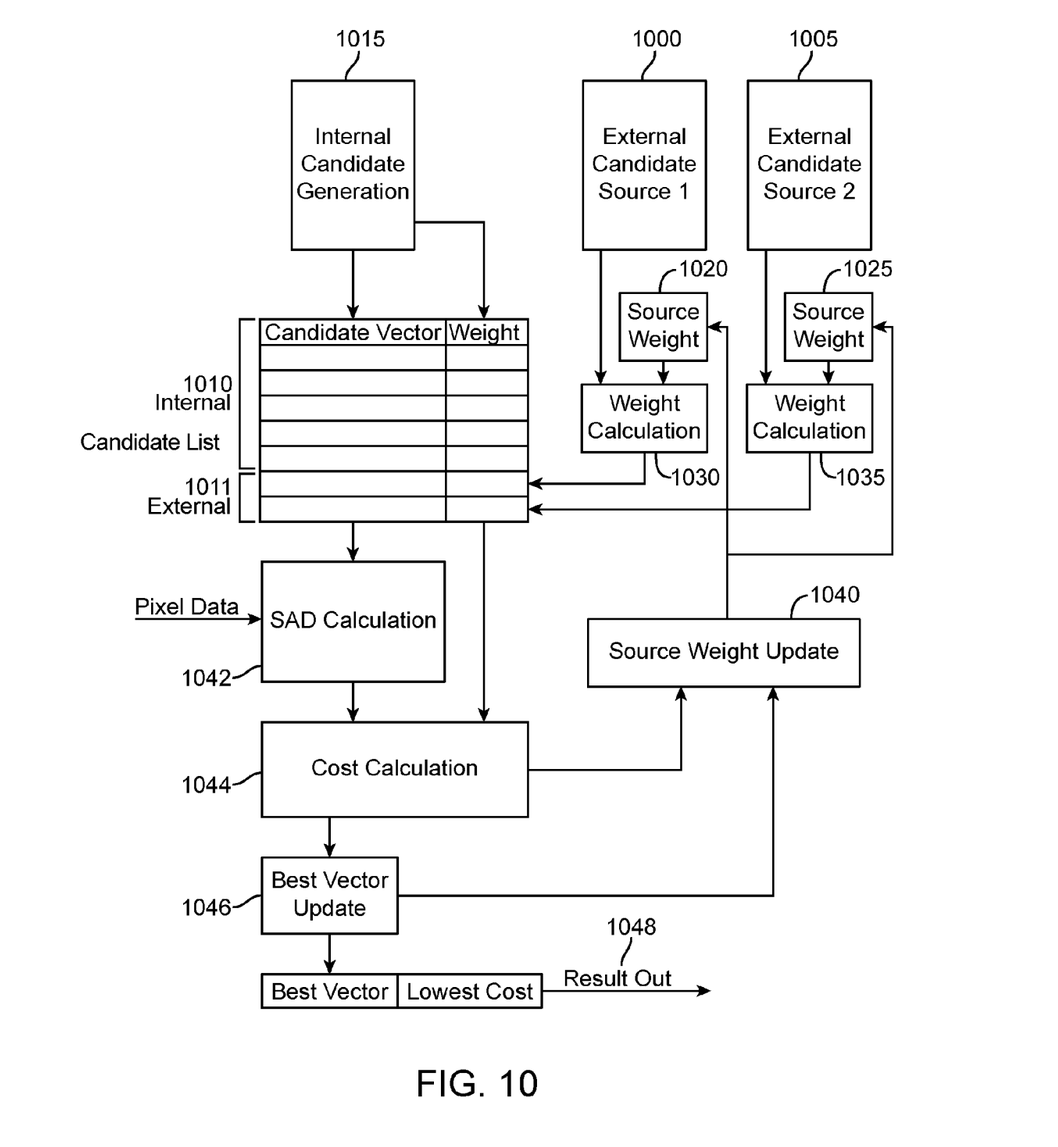
FIG. 10 is a block diagram showing motion vector candidate evaluation in an example system using external motion vector candidate sources.

FIG. 10 is a block diagram of an example system in which motion vector candidates are supplied from external sources. In this example two external candidate sources, 1000 and 1005 are shown. The candidate list is divided into two parts. The internal part 1010 contains candidate motion vectors and corresponding weights generated by the internal candidate generation unit 1015. The internal candidate generation unit corresponds to the candidate generation unit 900 shown in FIG. 9. Motion vectors candidates and weights in the second part of the list, 1011, are derived from the external sources 1000 and 1005. The SAD calculation, cost calculation, and best vector update blocks are similar to those shown in FIG. 9.

Each external candidate source has a corresponding weight calculation block and a weight associated with the source as a whole. For example, source 1000 has weight 1020, and weight calculation block 1030. Source 1005 has weight 1025 and weight calculation block 1035.

Taking the example of external candidate source 1000, a vector is supplied to weight calculation block 1030. The weight calculation block 1030 takes a further input from the source weight 1020, and derives a weight or weights for the vector. The vector and associated weights are then stored in candidate list 1011. The weights derived for each vector may be influenced by the source weight 1020, which reflects the extent to which source 1000 is to be trusted, and also by analysis of the individual vector, perhaps with respect to the rest of the external vector field or the vectors produced by the motion estimator.

In another example, the data supplied from an external candidate source, e.g., 1005, to weight calculation block 1035 may include data in addition to the vector candidate. This is appropriate when the external source has access to information that is not otherwise available to the motion estimator. For example, the external candidate source may provide weighting values for individual vectors, or mask values indicating the pixels to which the vector is expected to apply.

Motion vector candidates from the internal, 1010, and external, 1011, candidate lists are evaluated in a manner similar to that shown in FIG. 9, using SAD calculation 1042, a cost calculation 1044 derived from the SAD value and weights, and comparison with a best vector 1046 to produce a result 1048 which is the vector with the lowest overall cost.

The source weight update unit, 1040, examines the cost metric for each vector candidate in list 1011, and whether that candidate is eventually selected as the best vector for the block. The source weight, 1020 or 1025, depending on the original source of the candidate, can then be updated to reflect the degree to which that particular source is trusted to provide good candidates. An external source which consistently provides candidates which are selected, or which are very similar to the candidates that are selected, will have its weight adjusted such that its candidates are considered more favourably in the future. Conversely, an external source whose candidates are rarely selected will not be trusted, and those candidates will be less likely to be used in the future.

The invention claimed is:

1. A machine-implemented method for motion estimation in a sequence of video images, comprising:
   subdividing each field or frame of a sequence of video images into a plurality of blocks;
   assigning to each block in each video field or frame a set of candidate motion vectors;
   for each block in a current video field or frame, selecting a vector that produces a best match to a block in a previous video field or frame, from the set of candidate motion vectors assigned to that block; and
   forming a motion vector field for the current video field or frame using the selected vector for each block,
   wherein the set of candidate motion vectors assigned to a block include one or more candidate vectors derived from an external source vector field,
   and wherein each candidate motion vector from an external source is assigned a weighting value, that biases towards or away from the selection of that candidate motion vector.

2. A method according to claim 1, wherein an external source vector field is assigned a weighting value that biases towards or away from the selection of all candidate motion vectors from the external source vector field.

3. A method according to claim 1, wherein the weighting value that biases towards or away from the selection of a candidate motion vector from an external source vector field is derived from the weighting value assigned to the candidate motion vector and from the weighting value assigned to the vector field from the external source.

4. A method according to claim 1, wherein the weighting value that biases towards or away from the selection of a candidate motion vector is provided by the external source.

5. A method according to claim 1, wherein the weighting value that biases towards or away from the selection of a candidate motion vector is determined from the external source.

6. A method according to claim 5, wherein the weighting value that biases towards or away from the selection of a candidate motion vector is derived from the number of pixels in the block in a current video field or frame that are co-located with pixels used in the generation of the motion vector candidate provided by the external source.

7. A method according to claim 2, wherein the weighting value that biases towards or away from the selection of candidate motion vectors from the external source vector field is provided by the external source.

8. A method according to claim 2, wherein the weighting value that biases towards or away from the selection of candidate motion vectors from the external source vector field is determined from the external source.

9. A method according to claim 1, wherein the weighting value that biases towards or away from the selection of candidate motion vectors from the external source is derived from the similarity of the vector field formed from the selected vectors for each block to the external source vector field.

10. A method according to claim 1, wherein the weighting value that biases towards or away from the selection of candidate motion vectors from the external source is derived from the similarity of a region of vectors in the vector field formed from the selected vectors for each block to a co-located region of vectors in the external source vector field.

11. A method according to claim 1, wherein the weighting value that biases towards or away from the selection of candidate motion vectors from the external source is derived from the similarity of a set of recently selected vectors to the co-located vectors in the external source vector field.

12. A method according to claim 9, wherein the weighting value that biases towards or away from the selection of candidate motion vectors from the external source is derived from the historical similarity of vector fields previously formed from the selected vectors for each block to the external source vector fields.

13. A method according to claim 9, wherein the similarity of vector fields is determined by accumulating a measure of similarity of the vectors within the fields, and similarity of vectors is derived from the difference in magnitude and direction of the vectors.

14. A method according to claim 9, wherein the similarity of vector fields is determined by entropic measures.

15. A method according to claim 1, wherein the one or more candidate motion vectors derived from an external source vector field are derived from a motion estimator elsewhere in the system.

16. A method according to claim 1, wherein the one or more candidate motion vectors derived from an external source vector field are derived from a source elsewhere in the system that is not a motion estimator.

17. A method according to claim 1, wherein the one or more candidate motion vectors derived from an external source vector field are derived from vectors supplied by a computer graphics engine.

18. A method according to claim 1, wherein the one or more candidate motion vectors derived from an external source vector field are derived from vectors supplied by an overlay compositing engine.

19. A method according to claim 1, wherein a best match is defined as the vector that represents the true motion of objects in the scene.

20. A method according to claim 1, wherein a best match is defined as the vector that produces the closest match between areas of pixel data in the current and previous video fields or frames.

21. Apparatus for motion estimation in a sequence of video images comprising:
   a source of pluralities of blocks, each plurality from a respective subdivided field or frame of a sequence of video images;
   a generator of internal motion vector candidates;

one or more external sources of candidate motion vectors;

a memory coupled to the generator of internal motion vector candidates and to the one or more external sources of candidate motion vectors, and storing a motion vector candidate list, comprising internal motion vector candidates and one or more motion vectors from the one or more external sources of candidate motion vectors;

a selector configured, for each block in a current video field or frame, to select a vector that produces a best match to a block in a previous video field or frame of the sequence of video images, from a set of candidate motion vectors assigned to that block from the motion vector candidate list; and one or more of a deinterlacer and a frame rate converter configured to form a motion vector field for the current video field or frame using the selected vector for each block, wherein each candidate motion vector from the external source is assigned a weighting value that biases towards or away from the selection of that candidate motion vector.

22. Apparatus according to claim 21, wherein an external source vector field is assigned a weighting value that biases towards or away from the selection of all candidate motion vectors from the external source vector field.

23. Apparatus according to claim 21, wherein the weighting value that biases towards or away from the selection of a candidate motion vector is derived from the weighting value assigned to the candidate motion vector and from the weighting value assigned to the vector field from the external source.

24. Apparatus according to claim 21, wherein the weighting value that biases towards or away from the selection of a candidate motion vector is provided by the external source.

25. Apparatus according to claim 21, wherein the weighting value that biases towards or away from the selection of a candidate motion vector is determined from the external source.

26. Apparatus according to claim 25, wherein the weighting value that biases towards or away from the selection of a candidate motion vector is derived from the number of pixels in the block in a current video field or frame that are co-located with pixels used in the generation of the motion vector candidate provided by the external source.

27. Apparatus according to claim 21, wherein the weighting value that biases towards or away from the selection of candidate motion vectors from the external source is derived from the similarity of the vector field formed from the selected vectors for each block to the external source vector field.

28. Apparatus according to claim 21, wherein the weighting value that biases towards or away from the selection of candidate motion vectors from the external source is derived from the similarity of a region of vectors in the vector field formed from the selected vectors for each block to a co-located region of vectors in the external source vector field.

29. Apparatus according to claim 21, wherein the weighting value that biases towards or away from the selection of candidate motion vectors from the external source is derived from the similarity of a set of recently selected vectors to the co-located vectors in the external source vector field.

30. Apparatus according to claim 29, wherein the weighting value that biases towards or away from the selection of candidate motion vectors from the external source is derived from the historical similarity of vector fields previously formed from the selected vectors for each block to the external source vector fields.

31. Apparatus according to claim 29, wherein the similarity of vector fields is determined by accumulating a measure of similarity of the vectors within the fields, and similarity of vectors is derived from the difference in magnitude and direction of the vectors.

32. Apparatus according to claim 29, wherein the similarity of vector fields is determined by entropic measures.

33. Apparatus according to claim 21, wherein the candidate motion vector derived from an external source is derived from a motion estimator elsewhere in the system.

34. Apparatus according to claim 21, wherein the candidate motion vector derived from an external source is derived from a source elsewhere in the system that is not a motion estimator.

35. Apparatus according to claim 21, wherein the candidate motion vector derived from an external source is derived from vectors supplied by a computer graphics engine.

36. Apparatus according to claim 21, wherein the candidate motion vector from an external source is derived from vectors supplied by an overlay compositing engine.

* * * * *